United States Patent
Hong et al.

(10) Patent No.: US 10,855,658 B2
(45) Date of Patent: Dec. 1, 2020

(54) METHOD FOR TRANSMITTING AND RECEIVING DATA USING WLAN CARRIERS AND APPARATUS THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 242 days.

(21) Appl. No.: 15/256,869

(22) Filed: Sep. 6, 2016

(65) Prior Publication Data

US 2017/0094701 A1 Mar. 30, 2017

(30) Foreign Application Priority Data

Sep. 24, 2015 (KR) .................. 10-2015-0135811
Jun. 9, 2016 (KR) .................. 10-2016-0071849

(51) Int. Cl.
*H04L 29/06* (2006.01)
*H04W 76/12* (2018.01)
(Continued)

(52) U.S. Cl.
CPC ......... *H04L 63/0272* (2013.01); *H04W 76/11* (2018.02); *H04W 76/12* (2018.02);
(Continued)

(58) Field of Classification Search
CPC ... H04W 76/022; H04W 76/12; H04W 76/11; H04W 84/12; H04W 92/10; H04W 16/14;
(Continued)

(56) References Cited

U.S. PATENT DOCUMENTS

2013/0242783 A1  9/2013 Horn et al.
2013/0242897 A1  9/2013 Meylan et al.
(Continued)

FOREIGN PATENT DOCUMENTS

CN  101841880 A  9/2010
CN  103582011 A  2/2014
(Continued)

OTHER PUBLICATIONS

State Intellectual Property Office of People's Republic of China, Office Action of corresponding CN Patent Application No. 201610810752.3, dated Dec. 29, 2018.

*Primary Examiner* — Oussama Roudani
(74) *Attorney, Agent, or Firm* — IP Legal Services, LLC

(57) ABSTRACT

The present embodiment relates to a method and an apparatus for controlling a base station and a terminal to transmit ad/or receive specific user plane data through a WLAN carrier while transmitting the user plane data by adding the WLAN carrier to the E-UTRAN carrier in the RAN (Wireless Access Network) level. In particular, a method may be provided for transmitting and receiving data by a terminal. The method may include: receiving configuration information for transmitting and receiving data to and from a base station by using an IPsec (Internet Protocol Security) tunnel through a WLAN (wireless local area network) carrier, configuring the IPsec tunnel based on the configuration information and setting a data bearer by using the IPsec tunnel; and transmitting, to the base station, data that is received by using the IPsec tunnel from the upper layer in a tunnel entity of the terminal.

6 Claims, 6 Drawing Sheets

(51) Int. Cl.
*H04W 76/11* (2018.01)
*H04W 84/12* (2009.01)
*H04W 92/10* (2009.01)

(52) U.S. Cl.
CPC .......... *H04L 63/164* (2013.01); *H04W 84/12* (2013.01); *H04W 92/10* (2013.01)

(58) Field of Classification Search
CPC .......... H04W 84/042; H04L 63/07272; H04L 63/164; H04L 63/0272; H04L 63/0485
See application file for complete search history.

(56) References Cited

U.S. PATENT DOCUMENTS

| | | | |
|---|---|---|---|
| 2013/0242965 A1 | 9/2013 | Horn et al. | |
| 2014/0050086 A1* | 2/2014 | Himayat | H04N 21/2365 |
| | | | 370/230 |
| 2014/0321376 A1 | 10/2014 | Damnjanovic et al. | |
| 2015/0043447 A1* | 2/2015 | Stojanovski | H04W 76/14 |
| | | | 370/329 |
| 2015/0139184 A1 | 5/2015 | Wang et al. | |
| 2015/0156774 A1* | 6/2015 | Urie | H04L 5/001 |
| | | | 370/329 |
| 2015/0208309 A1* | 7/2015 | Taneja | H04W 36/0066 |
| | | | 455/426.1 |
| 2015/0373607 A1* | 12/2015 | Zhu | H04W 36/22 |
| | | | 370/331 |
| 2016/0302077 A1* | 10/2016 | Yi | H04W 76/15 |
| 2016/0302110 A1* | 10/2016 | Baboescu | H04L 12/4633 |
| 2017/0207893 A1 | 7/2017 | Meylan et al. | |
| 2018/0014226 A1* | 1/2018 | Li | H04L 47/41 |
| 2018/0092147 A1* | 3/2018 | Pelletier | H04W 12/04 |
| 2018/0132143 A1* | 5/2018 | Sirotkin | H04W 88/06 |
| 2018/0191493 A1* | 7/2018 | Huang | H04L 63/164 |
| 2019/0124511 A1* | 4/2019 | Sirotkin | H04W 76/12 |

FOREIGN PATENT DOCUMENTS

| | | |
|---|---|---|
| CN | 104170308 A | 11/2014 |
| KR | 10-2014-0115923 A | 10/2014 |
| KR | 10-2015-0018300 A | 2/2015 |
| WO | 2013/185653 A1 | 12/2013 |

\* cited by examiner

METHOD FOR TRANSMITTING AND RECEIVING DATA USING WLAN CARRIERS AND APPARATUS THEREOF

CROSS REFERENCE TO RELATED APPLICATION

This application claims priority from Korean Patent Application Nos. 10-2015-0135811 & 10-2016-0071849, filed on Sep. 24, 2015 & Jun. 9, 2016, which are hereby incorporated by reference for all purposes as if fully set forth herein.

BACKGROUND OF THE INVENTION

1. Field of the Invention

The present embodiment relates to a method and an apparatus for controlling a base station and a terminal to transmit and/or receive specific user plane data through a wireless local area network (WLAN) carrier while transmitting the user plane data by adding the WLAN carrier to an evolved universal terrestrial radio access network (E-UTRAN) carrier in the radio access network (RAN) (e.g., Wireless Access Network) level.

2. Description of the Prior Art

With the development of communication systems, various types of wireless terminals have been introduced to consumers, such as companies and individuals. The current mobile communication system of the $3^{rd}$ generation partnership project (3GPP) family, such as LTE (Long Term Evolution) or LTE-Advanced, is a high-speed and high-capacity communication system that enables the transmission and reception of a variety of data (such as videos or wireless data), as well as a voice service, and it requires a technique for transmitting a large amount of data corresponding to a wired communication network. A large amount of data may be efficiently transmitted by using a plurality of cells.

However, the base station has limitations on the provision of a large amount of data to a plurality of terminals by using limited frequency resources. That is, it requires high cost for a specific commoncarrier to ensure the frequency resources that can be exclusively used.

Meanwhile, the unlicensed frequency band is not allowed to be exclusively used by a specific commoncarrier or by a specific communication system. Such an unlicensed frequency band may be shared with a number of providers or communication systems. For example, the WLAN (Wireless Local Area Network) technique, which is represented by Wi-Fi, provides a data transmission and reception service by using frequency resources in the unlicensed band.

Therefore, there is demand for technique for enabling a mobile communication system to transmit and receive data to and from a terminal by using the corresponding WLAN APs (Access Points). In particular, there is also demand for a detailed process and method for enabling a base station to transmit and receive data to and from a terminal by using a WLAN carrier and a base station carrier. In addition, there is need for allowing a typical legacy terminal that uses only the base station carrier to easily use the WLAN carrier.

SUMMARY OF THE INVENTION

The present embodiments, which have been made in this background, provide a detailed process and method for enabling a terminal and a base station to transmit and receive data by aggregating or integrating a WLAN carrier and a base station carrier.

In addition, the present embodiments provide: a tunnel-based LTE-WLAN integrating method for reusing an existing WLAN AP; an IP allocating and changing process associated with WLAN tunnel establishment; and a method and an apparatus for identifying data in a tunnel.

An embodiment that has been made in order to overcome the problems described above provides a method for transmitting and receiving data by a terminal. The method may include: receiving configuration information for transmitting and receiving data to and from a base station by using an IPsec (Internet Protocol Security) tunnel through a WLAN (wireless local area network) carrier, configuring the IPsec tunnel based on the configuration information and setting a data bearer by using the IPsec tunnel; and transmitting, to the base station, data that is received from the upper layer by using the IPsec tunnel in a tunnel entity of the terminal.

Another embodiment provides a method for transmitting and receiving data by a base station. The method may include: transmitting configuration information for transmitting and receiving data to and from a terminal by using an IPsec (Internet Protocol Security) tunnel through a WLAN (wireless local area network) carrier, receiving data by using the IPsec tunnel; and transferring, to the upper layer, the data that is received by using the IPsec tunnel in a tunnel entity of the base station.

Another embodiment provides a terminal for transmitting and receiving data. The terminal may include a receiving unit configured to receive configuration information for transmitting and receiving data to and from a base station by using an IPsec (Internet Protocol Security) tunnel through a WLAN (wireless local area network) carrier, a controller configured to configure the IPsec tunnel based on the configuration information and to set a data bearer by using the IPsec tunnel; and a transmitting unit configured to transmit, to the base station, data that is received from the upper layer by using the IPsec tunnel in a tunnel entity of the terminal.

Another embodiment provides a base station device for transmitting and receiving data. The base station may include: a transmitting unit configured to transmit configuration information for transmitting and receiving data to and from a terminal by using an IPsec (Internet Protocol Security) tunnel through a WLAN (wireless local area network) carrier, a receiving unit configured to receive data by using the IPsec tunnel; and a controller configured to transfer, to the upper layer, the data that is received by using the IPsec tunnel in a tunnel entity of the base station.

According to the present embodiments described above, even the legacy terminal can transmit and receive data by aggregating or integrating the WLAN carrier and the base station carrier.

In addition, the present embodiments can provide an identifying process for each wireless bearer in the case where the terminal and the base station transmit and receive data by using the WLAN carrier based on the IP tunnel.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
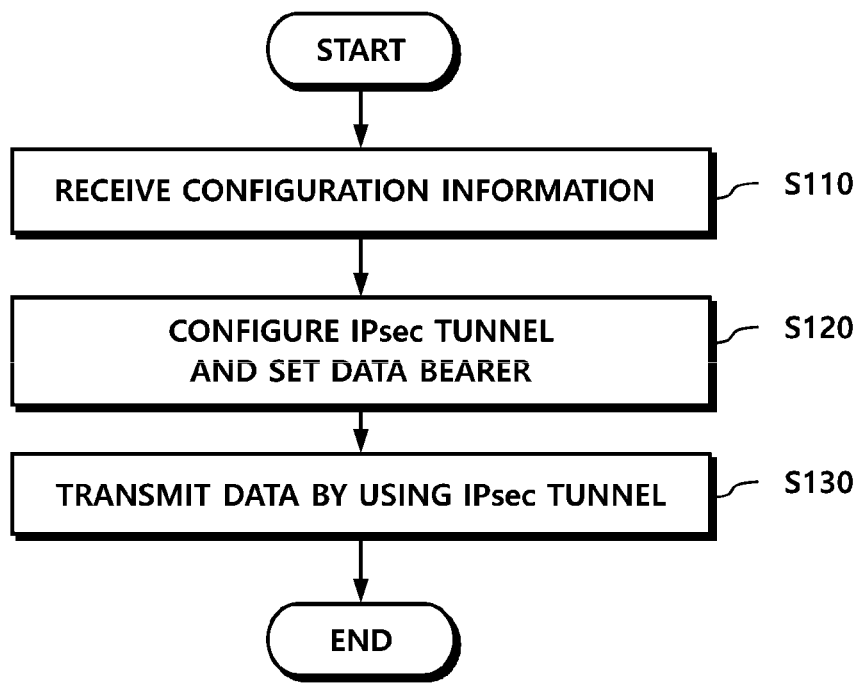
FIG. 1 is a view for explaining the operation of a terminal according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In the present specifications, a machine type communication (MTC) terminal refers to a low cost or low complexity terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, a radio remote head (RRH), an antenna, a radio unit (RU), a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The WLAN carrier in the present specification refers to a wireless resource of the WLAN, and may be replaced with a variety of terms, such as a WLAN wireless link, WLAN wireless, a WLAN wireless resource, or a WLAN wireless network, as necessary. However, hereinafter, the WLAN wireless link, the WLAN wireless, the WLAN wireless resource, or the WLAN wireless network will be expressed as the WLAN carrier for the convenience of understanding.

In addition, the WLAN termination represents a logical WLAN network node in the present specification. For example, it may be a WLAN AP or a WLAN AC. The WLAN termination may be a WLAN network node (such as an existing WLAN AP or an existing WLAN AC), or may be a WLAN network node that includes an adding function for aggregating the WLAN with an existing WLAN AP or with an existing WLAN AC for transmission. The WLAN termination may be implemented as an independent entity, or may be implemented as a functional entity that is included in another entity. Hereinafter, in the present specification, the WLAN network node will be replaced with the WLAN termination or with the WLAN AP, as necessary. In addition, in the present specification, the wireless resource provided by the base station (eNB) will be referred to as a base station wireless resource, a base station carrier, or an E-UTRAN carrier, if necessary.

Meanwhile, the tunnel entity in the present specification means an entity for processing data that is transmitted and received through the IPsec tunnel, and it is not limited to a specific term. For example, the tunnel entity may encompass various terms, such as an IPsec tunnel entity, a user data transmitting and receiving entity through the IPsec, an entity for each wireless bearer that is configured in the upper layer of the IPsec, an EPS bearer entity, an adaptation entity, a tunnel upper layer adaptation entity, an LWIPEP (LTE/WLAN Radio Level Integration Using IPsec Tunnel Encapsulation Protocol) entity, or an IPsec tunnel entity through the WLAN. Hereinafter, although the description will be made by using the tunnel entity for the convenience of understanding, it should be understood to include all of the entities that have the same function, or may be understood in terms of a function.

In addition, an IPsec tunnel in the present specification means a tunnel that is configured between a terminal and a base station for transmitting and receiving data through a WLAN carrier. The IPsec tunnel may be referred to as various terms. For example, the IPsec tunnel may be referred to as various terms, such as a GRE tunnel, a GTP tunnel, or a certain tunnel based on encapsulation, but it is not limited thereto.

WLAN interworking technology provides a RAN assisted WLAN interworking function. The E-UTRAN may help with terminal-based bilateral traffic steering between the E-UTRAN and the WLAN with respect to the terminals in the RRC_IDLE state and in the RRC_CONNECTED state.

The E-UTRAN provides assistant parameters to the terminal through broadcast signaling or through dedicated RRC signaling. The RAN assistant parameters may contain at least one of: an E-UTRAN signal strength threshold value; a WLAN channel usage threshold value; a WLAN backhaul data rate threshold value; the WLAN signal strength {or a WLAN signal strength threshold value (e.g., a BeaconRSSI threshold value)}; and an offload preference indicator. In addition, the E-UTRAN may provide a WLAN identifier list to the terminal through broadcast signaling.

In order to determine traffic steering between the E-UTRAN and the WLAN, which is standardized in the document of 3GPP IS 23.402 Architecture Enhancements for Non-3GPP Accesses, the terminal may use the RAN assistant parameters for evaluating the access network selection and traffic steering rules defined in the TS 36.304 document or the access network discovery and selection function (ANDSF) policies defined in the TS 24.312 document.

When the access network selection and traffic steering rules defined in the IS 36.304 document are fulfilled, the terminal may indicate the same in the upper layer of the AS (access stratum).

When the terminal applies the access network selection and traffic steering rules, the terminal performs the traffic control between the E-UTRAN and the WLAN in the APN granularity. As described above, the RAN assisted WLAN interworking function provides only a method in which the E-UTRAN and the WLAN are independently implemented as a stand-alone and cooperate with each other.

The limitations of the aforementioned interworking technique using the stand-alone E-UTRAN and WLAN require an LTE-WLAN aggregation technique in which the base station uses the E-UTRAN and WLAN wireless resources in the PDCP level. However, the upgrade of the legacy WLAN AP is required to use the LTE-WLAN aggregation technique in the PDCP level. For example, the upgrade of the legacy AP is necessary to provide the tunnel creation and flow control between the base station and the WLAN node. In order to solve the problem above, the present embodiment proposes an IPsec tunnel-based LTE-WLAN aggregation technique for reusing a legacy AP. In particular, a detailed control process and a user plane data transmission method between the terminal and the base station should be provided for the IPsec tunnel-based LTE-WLAN aggregation. More specifically, in order to establish a tunnel between the base station and the terminal through the WLAN, information for the establishment of the tunnel between the terminal and the base station through the WLAN should be shared. At this time, in the case of using the legacy WLAN node (e.g., a WLAN AP, a WLAN AC, or a WLAN termination), since the IP address of the terminal may be changed according to a WLAN node change, stable data communication may be difficult. In addition to the problem above, the IPsec tunnel established between two nodes may hardly identify and process data according to the user data properties.

As described above, the typical LTE-WLAN aggregation/integration method needs the upgrade of the legacy AP in order to provide the aggregation technique in the PDCP level. Even the IPsec tunnel-based LTE-WLAN aggregation/integration method to solve the problem above does not provide a detailed control process and a user plane data transmission method between the terminal and the base station. In particular, in the case of using the legacy WLAN node, when the IP address of the terminal varies according to a WLAN node change, stable data communication may be difficult. In addition, the IPsec tunnel established between two nodes may hardly identify bearers to process data according to the data properties between the terminal and the base station.

The present embodiment, which has been made in order to solve the problem above, provides a control process and a data transmission method for providing a tunnel-based LTE-WLAN aggregation/integration technique for reusing an existing AP. In particular, the present embodiment provides a terminal IP allocating and changing process associated with the WLAN tunnel establishment and provides a method for identifying and controlling data in the tunnel.

FIG. 1 is a view for explaining operations of a terminal according to an embodiment.

In accordance with at least one embodiment, a method may be provided for transmitting and receiving data by a terminal. Such a method may include: receiving configuration information for transmitting and receiving data to and from a base station by using an IPsec (Internet Protocol Security) tunnel through a WLAN (wireless local area network) carrier, configuring the IPsec tunnel based on the configuration information and setting a data bearer by using the IPsec tunnel; and transmitting, to the base station, data that is received from the upper layer by using the IPsec tunnel in a tunnel entity of the terminal.

Referring to FIG. 1, the terminal may perform an operation of receiving configuration information for transmitting and receiving data to and from the base station by using the IPsec tunnel through the WLAN carrier (S110). As described above, the IPsec tunnel may be configured for data transmission and reception between the terminal and the base station by adding the WLAN carrier without change in the existing WLAN node. The IPsec tunnel may be configured between the terminal and the wireless network, and the IPsec tunnel may be configured through the WLAN carrier. For example, the IPsec tunnel may be configured between the terminal and the base station and may be configured through the WLAN carrier. As another example, the IPsec tunnel may be configured between the terminal and a gateway that is connected to the base station and may be configured through the WLAN carrier. To this end, the terminal may receive, from the base station, configuration information to configure the IPsec tunnel. For example, the configuration information may contain at least one piece of: WLAN identification information; IP (Internet Protocol) address information for the IPsec tunnel; IKE (Internet Key Exchange) setting information; and data bearer identification information, which uses the IPsec tunnel. Here, the IP (Internet Protocol) address information for the IPsec tunnel indicates the base station IP address information or the gateway IP address information, which is connected to the base station. In addition, the IKE setting information represents parameters that are used in the IKE authentication procedure. As another example, the configuration information may contain WLAN cell configuration information. The WLAN cell configuration information may contain at least one piece of: WLAN cell identifier information; WLAN mobility set identifier information; band/frequency information; and WLAN identification information (e.g., BSSID/HESSID/SSIDs). The configuration information may contain information indicating the WLAN access authentication with respect to the cell that requires the WLAN access authentication among the WLAN cells. As another example, the configuration information may contain information indicating the WLAN access authentication in order for the terminal to use the WLAN carrier. Furthermore, the configuration information may contain information necessary for the terminal and the base station to configure the IPsec tunnel through the WLAN carrier.

The terminal may receive the aforementioned configuration information through the upper layer signaling. For example, the terminal may receive the configuration information that is contained in an RRC connection reconfiguration message to then be transmitted.

In addition, the terminal may perform an operation of configuring the IPsec tunnel based on the configuration information and setting a data bearer by using the IPsec tunnel (S120). For example, the terminal may establish/configure the IPsec tunnel through the WLAN carrier by using the received configuration information. In addition, the terminal may set the data bearer for transmitting and receiving data to and from the base station through the configured IPsec tunnel. The terminal that has received the configuration information from the base station may set the data bearer by using the received configuration information. The data of the corresponding data bearer may be transmitted to, or received from, the base station through the IPsec tunnel described above.

In addition, the terminal may perform an operation of transmitting, to the base station, the data that is received from the upper layer in the tunnel entity of the terminal by using the IPsec tunnel (S130). The tunnel entity may perform the data transmission and reception operation between the terminal and the base station through the IPsec tunnel. To this end, the tunnel entity may be configured to be peered with respect to the terminal and the base station, respectively. For example, the tunnel entity of the terminal transfers IP packets that are received from the upper layer (e.g., an IP layer) to the lower layer. In addition, the tunnel entity of the terminal transfers a PDU that is received from the lower layer to the upper layer. In this case, the tunnel entity identifies an SDU for each core network interface bearer (eps bearer), which is received from the upper layer, and adds bearer identification information to the SDU to then be transferred to the lower layer. The bearer identification information may be one of: data wireless bearer identification information, eps bearer identification information; and logical channel identification information. Similarly, the tunnel entity may remove the bearer identification information from the PDU that is received from the base station when transferring the PDU to the upper layer.

Meanwhile, the tunnel entity may be terminal-specifically configured, and the tunnel entity may perform an encapsulation or decapsulation operation for the data that is transmitted or received through the IPsec tunnel.

The terminal may configure the IPsec tunnel with the base station through the WLAN carrier according to the operation described above, and the terminal may perform the data transmission and reception through the IPsec tunnel. In addition, the tunnel entities configured in the terminal and the base station for the operation above may add/remove the bearer identification information (for example, a DRB-Identity) for identifying the bearers in order to thereby transmit and receive data by a specific bearer through the IPsec tunnel.

Hereinafter, the data transmission and reception configuration of the terminal and the base station including the aforementioned tunnel entity, as well as the details of the terminal operation, will be described in more detail with reference to the drawings.

Figure 2:
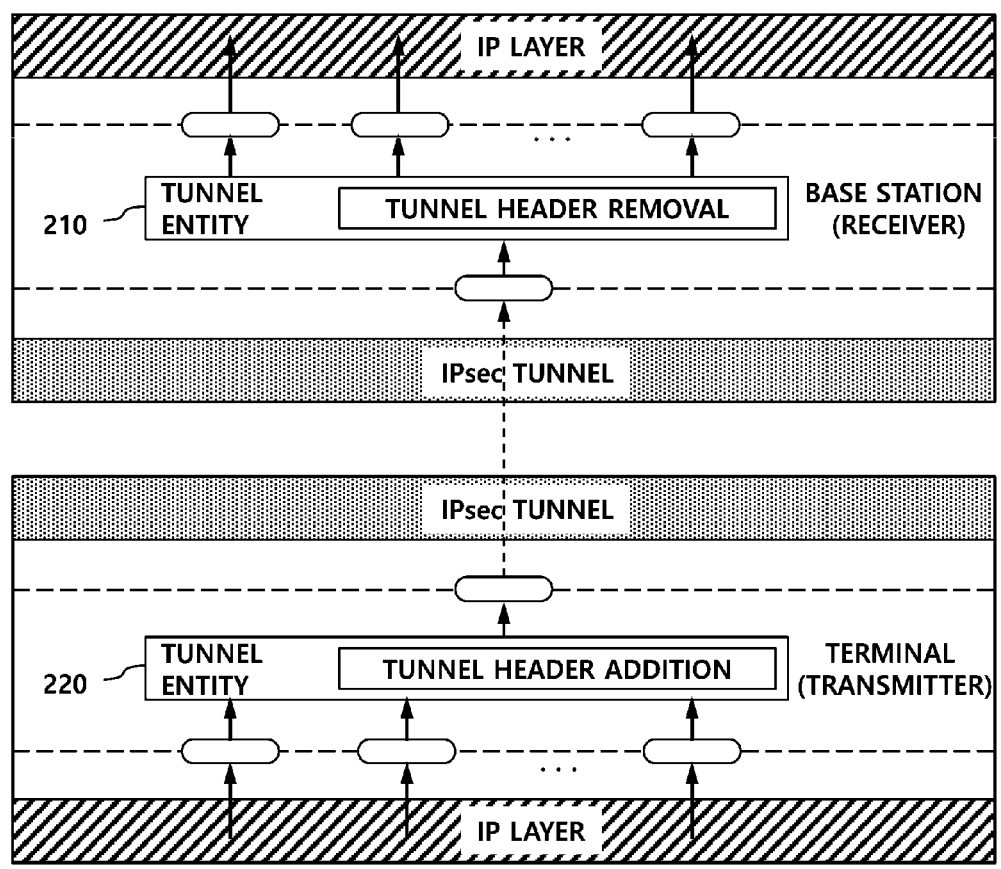
FIG. 2 is a view for explaining the conceptual layer configuration of a terminal and a base station according to an embodiment.

FIG. 2 is a view for explaining conceptual layer configuration of a terminal ad a base station according to an embodiment.

Referring to FIG. 2, the terminal and the base station may transmit and receive data through the IPsec tunnel. The IPsec tunnel is configured through the WLAN carrier. More specifically, when the terminal transmits uplink data to the base station, the tunnel entity 220 in the terminal receives the SDU for each core network interface bearer from the IP layer. The tunnel entity 220 adds a tunnel header to the received SDU and transfers the same to the lower layer for transmission. The tunnel header may be the bearer identification information described above, and the tunnel header may be, for example, the DRB identity.

The data transmitted through the IPsec tunnel in the lower layer is received in the lower layer of the base station. The tunnel entity 210 of the base station, which is configured to be peered with the tunnel entity 220 of the terminal, removes the tunnel header from the PDU that is received from the lower layer, and the tunnel entity 210 transfers the same to the upper layer (for example, an IP layer). As described above, the tunnel header may be the bearer identification information. Meanwhile, the IPsec tunnel is configured through the WLAN carrier.

Figure 3:
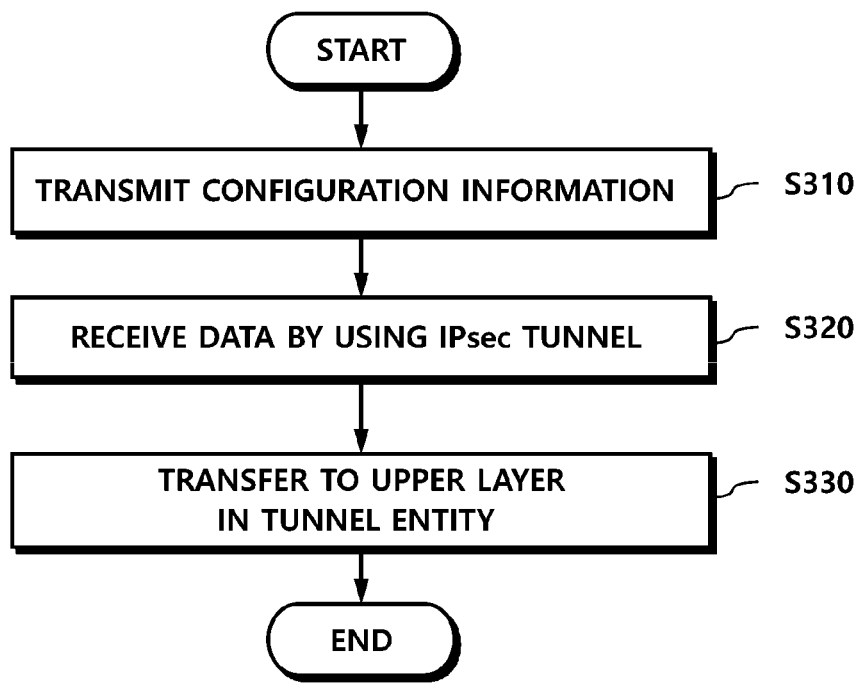
FIG. 3 is a view for explaining the operation of a base station according to an embodiment.

FIG. 3 is a view for explaining operations of a base station according to an embodiment.

Referring to FIG. 3, the base station may perform an operation of transmitting configuration information for transmitting and receiving data to and from the terminal by using the IPsec tunnel through the WLAN carrier (S310). To this end, the base station creates the configuration information for configuring the IPsec tunnel and transmits the same to the terminal. The IPsec tunnel may be configured through the WLAN carrier, as described above. For example, the IPsec tunnel may be configured between the terminal and the base station, and the IPsec tunnel may be configured through the WLAN carrier. As another example, the IPsec tunnel may be configured between the terminal and a gateway that is connected to the base station, and the IPsec tunnel may be configured through the WLAN carrier. The configuration information for transmitting and receiving data to and from the terminal by using the IPsec tunnel through the WLAN carrier may contain at least one piece of: WLAN identification information; IP (Internet Protocol) address information for the IPsec tunnel; IKE (Internet Key Exchange) setting information; and data bearer identification information, which uses the IPsec tunnel. Alternatively, the configuration information may contain WLAN cell configuration information. The WLAN cell configuration information may contain at least one piece of: WLAN cell identifier information; WLAN mobility set identifier information; band/frequency information; and WLAN identification information (e.g., BSSID/HESSID/SSIDs). The configuration information may contain information indicating the WLAN access authentication with respect to the cell that requires the WLAN access authentication among the WLAN cells. Alternatively, the configuration information may contain information indicating the WLAN access authentication in order for the terminal to use the WLAN carrier. Furthermore, the configuration information may contain information necessary for the terminal and the base station to configure the IPsec tunnel through the WLAN carrier. Here, the IP (Internet Protocol) address information for the IPsec tunnel indicates the base station IP address information or the gateway IP address information, which is connected to the base station. In addition, the IKE setting information represents parameters that are used in the IKE authentication procedure.

The configuration information described above may be transmitted to the terminal through the upper layer signaling. For example, the base station may include the configuration information in the RRC connection reconfiguration message to then be transmitted.

In addition, the base station may perform an operation of receiving data by using the IPsec tunnel (S320). The base station may configure a tunnel entity for receiving data by using the IPsec tunnel. The tunnel entity in the base station may be configured to be peered with the tunnel entity of the terminal. The base station may receive uplink data by using the IPsec tunnel. Alternatively, the base station may transmit downlink data by using the IPsec tunnel. The IPsec tunnel may be configured to be associated with a specific data bearer. That is, the data of a specific bearer may be transmitted and received by using the IPsec tunnel.

In addition, the base station may perform an operation of transferring, to the upper layer, the data received by using the IPsec tunnel in the tunnel entity of the base station (S330). The uplink data received from the terminal may be transferred to the upper layer through the tunnel entity in the base station. In this case, the tunnel entity in the base station may remove the bearer identification information of the uplink data PDU, and the tunnel entity may transfer the same to the upper layer (such as the IP layer). The bearer identification information may be a DRB identity.

As described above, the terminal and the base station may configure the IPsec tunnel through the WLAN carrier, and the tunnel entity may add/remove the bearer identification information in order to thereby transmit and receive data of the data bearer associated with the IPsec tunnel.

Hereinafter, the operation of the terminal and the base station, which has been described in FIG. 1 to FIG. 3, will be described in more detail.

As described above, the RRC connection terminal may add the WLAN carrier by the control of the base station. In order for the base station to add the WLAN carrier without the additional upgrade of the existing WLAN AP, a tunnel may be created between the terminal and the base station through the WLAN with respect to the RRC connection terminal so that the WLAN carrier may be used. For example, the IPsec tunnel may be configured between the terminal and the base station, and the IPsec tunnel may be configured through the WLAN carrier. As another example, the IPsec tunnel may be configured between the terminal and a gateway that is connected to the base station, and the IPsec tunnel may be configured through the WLAN carrier. To this end, data may be transmitted between the terminal and the base station in the PDCP protocol layer or in the upper layer of the PDCP protocol layer through the WLAN based on the IPsec tunnel. For example, data may be transmitted between the terminal and the base station in the lower layer (i.e., the PDCP PDU) of the PDCP protocol layer through the WLAN based on the IPsec tunnel. As another example, data may be transmitted between the terminal and the base station in the upper layer (i.e., the PDCP SDU or the IP packet) of the PDCP protocol layer through the WLAN based on the IPsec tunnel.

Hereinafter, the description will be made of the case where the IPsec tunnel is configured in the upper layer of the PDCP protocol layer and data is transmitted between the base station and the terminal through the WLAN, but not limited thereto. In accordance to another embodiment, data may be transmitted in the lower layer of the PDCP protocol layer based on the IPsec tunnel.

In order to provide the aforementioned LTE-WLAN aggregation/integration technique, the terminal reports the LWA (LTE WLAN Aggregation) capability including a WLAN band that is supported. The terminal may have a separate capability bit for indicating that the interworking and aggregation functions are supported. The terminal may have a separate capability bit to indicate the aggregation for supporting the wireless bearer (e.g., a split bearer) through the PDCP on the LTE WLAN aggregation, and to indicate the support of the wireless bearer (e.g., a switched bearer) through the tunnel. The terminal reports the capability for supporting the wireless bearer through the tunnel.

One WLAN mobility set (hereinafter, referred to as a mobility set for the convenience of explanation) denotes a set of one or more WLAN APs that are identified by one or more BSSID/HESSID/SSIDs. While the terminal is configured with bearers that use the WLAN carrier, a WLAN mobility mechanism is applied in the WLAN mobility set. That is, the terminal may perform the mobility operation between the WLAN APs included in the mobility set without informing the base station.

Figure 4:
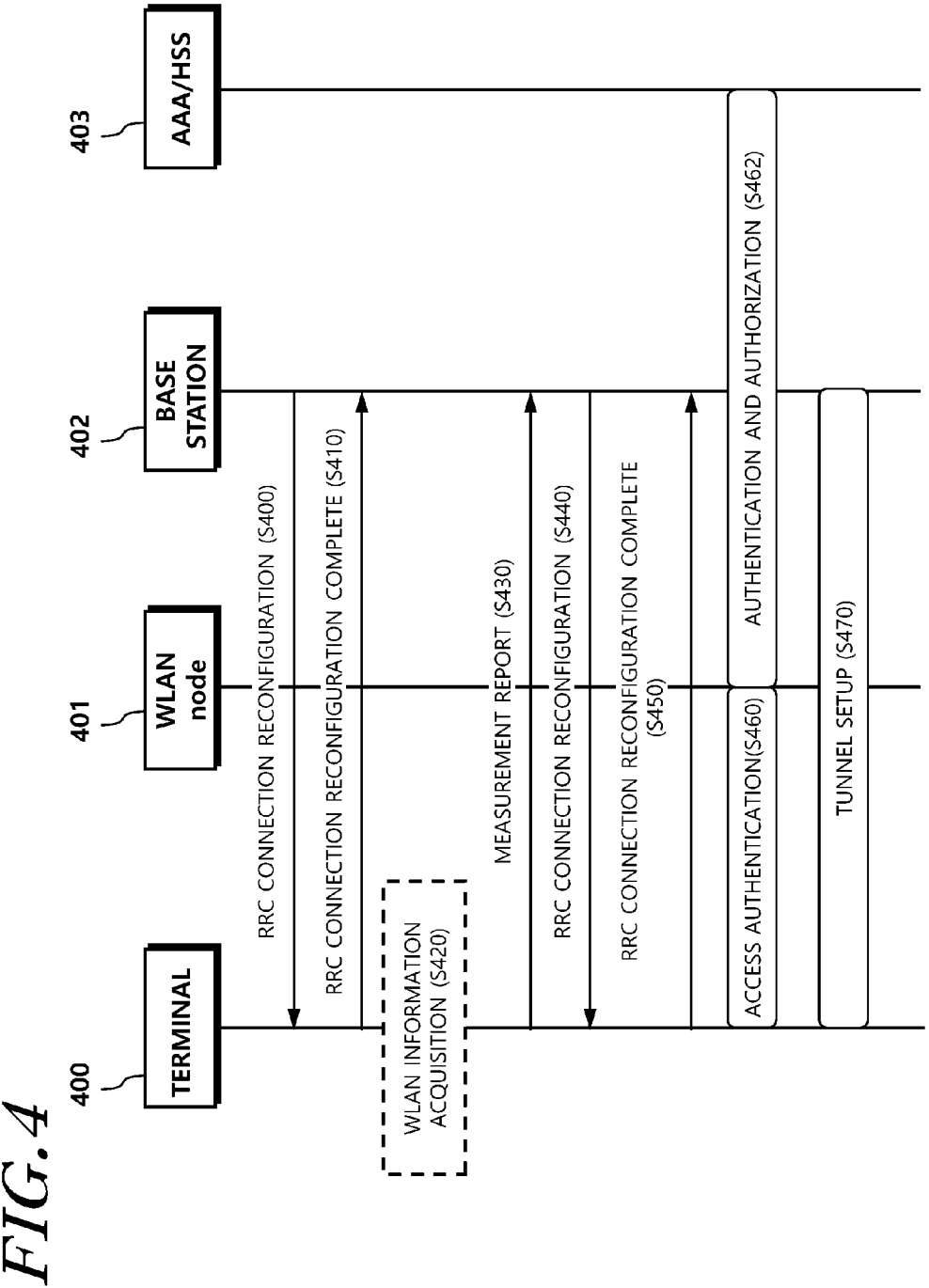
FIG. 4 is a view for explaining a WLAN carrier adding process based on the tunneling according to an embodiment.

FIG. 4 is a view for explaining a WLAN carrier adding process based on tunneling according to an embodiment.

Referring to FIG. 4, a base station 402 may configure the WLAN measurement in a terminal 400. To this end, the base station 402 may include measurement configuration information, which is necessary for the terminal 400 to measure the WLAN carrier, in an RRC connection reconfiguration message, and the base station 402 may transmit the same to the terminal 400 (S400).

The terminal 400 may apply the measurement configuration information, and transmit an RRC connection reconfiguration completion message (RRCConnectionReconfigurationComplete) to the base station 402 (S410) in response thereto.

The terminal 400 may obtain WLAN information (S420). For example, the terminal may measure the WLAN according to the measurement configuration information in order to thereby obtain at least one of: WLAN association state information; a WLAN identifier (BSSID/HESSID/SSID); an MAC address; and an IP address.

The terminal 400 may transmit, to the base station 402, the result of the aforementioned WLAN measurement through the measurement report (S430). The measurement report may contain information, such as the connection state of the WLAN or the connection quality state of the WLAN carrier, which are measured by the terminal 400 according to the measurement configuration information.

The base station 402 may determine to allocate the WLAN carrier to specific E-RABs and transmit an RRC connection reconfiguration message containing new wireless resource configuration information to the terminal 400 (S440). The new wireless resource configuration information may be determined by using the measurement report information that is transmitted by the terminal 400 in operation S430.

The terminal 400 configures/applies configuration information to use the WLAN carrier to the terminal 400 based on the RRC connection reconfiguration message. That is, the terminal 400 may configure the IPsec tunnel through the WLAN carrier by using the configuration information that is received from the base station 402, and the terminal 400 may set the data bearer by using the IPsec tunnel.

For example, the configuration information, by which the terminal 400 uses the WLAN carrier, may contain at least one piece of: WLAN cell/band/carrier/frequency/wireless link configuration information (hereinafter, referred to as WLAN cell configuration information for the convenience of explanation); and WLAN tunnel bearer/WLAN bearer/switched bearer (hereinafter, referred to as a tunnel bearer for the convenience of explanation) configuration information, which use the IPsec tunnel through the WLAN carriers.

The WLAN cell configuration information may contain at least one piece of: WLAN cell identifier information; WLAN mobility set identifier information; band/frequency information; WLAN identification information (BSSID/HESSID/SSIDs); information to indicate the WLAN access authentication in the cell that requires the WLAN access authentication among the WLAN cells; and information to indicate a WLAN primary cell that performs the data transmission through the WLAN among the WLAN cells. The terminal may perform the access authentication through the corresponding cell based on the information to indicate the WLAN access authentication cell or the information to indicate the cell that performs the WLAN data transmission.

The tunnel bearer configuration information may contain at least one piece of: IP address information for establishing the IPsec tunnel between the terminal and the base station through the WLAN carrier as common information for the tunnel bearers; eps bearer identification information (eps-bearerIdentity) as configuration information for each tunnel bearer, IP tunnel configuration information; security information; tunnel identification information (or DRB identification information) of the base station; and tunnel identification information of the terminal. Here, the IP (Internet Protocol) address information for the IPsec tunnel represents base station IP address information or IP address information of a gateway that is connected to the base station.

The terminal 400 may apply the new wireless resource configuration and transmit the RRC connection reconfiguration message to the base station 402 (S450).

Although the data shown hereinafter represents user plane data, it may be used to encompass control plane data as necessary. As described with reference to FIG. 1 to FIG. 3, the terminal 400 receives the configuration information in operation S440 in order to thereby configure the IPsec tunnel, and in order to thereby set the data bearer by using the IPsec tunnel. Now, the operation in which the terminal configures the IPsec tunnel by using the configuration information and sets the data bearer will be described in more detail below.

The terminal 400 may apply the new wireless resource configuration according the RRCConnectionReconfiguration message that is received in operation 440.

As an example for configuring the wireless resource by the terminal 400, the terminal 400 may configure the tunnel entity to be deactivated (or suspended or disabled) until the data transmission is available through the WLAN carrier according to the WLAN access authentication (for example, until operation S460, S462, or S470, or until operation S460, S462, or S470 is completed after a specific timer is initiated). More specifically, the terminal 400 creates/configures the tunnel entity according to the new wireless resource configuration, and the tunnel entity may be configured to be disabled. When the tunnel entity is disabled, the downlink or uplink data transmission through the WLAN carrier becomes disabled.

The base station 402 may recognize the success or failure of the WLAN access authentication and/or tunnel setup. The base station 402 may recognize the success or failure of the WLAN access authentication and/or tunnel setup in the process of the WLAN access authentication and/or tunnel setup with the terminal 400, or may recognize the same by receiving information on the success or failure of the WLAN access authentication and/or tunnel setup from the terminal 400.

If the WLAN access authentication and/or tunnel setup are successful, the base station 402 may activate (or resume or enable) the disabled bearer in order to transmit and receive data. The base station 402 may transmit, to the terminal 400, indication information to activate the disabled bearer. For example, the base station may transmit data through the E-UTRAN bearer until the tunnel bearer is configured to be disabled, and thereafter, the base station 402 may change the E-UTRAN bearer into the tunnel bearer through the RRCConnectionReconfiguration message in order to thereby use the same.

Another example in which the terminal applies the new wireless configuration according to the RRCConnectionRe-configuration message received in operation S440 will be described as follows. The terminal may include WLAN cell configuration information to use the WLAN wireless resources. In addition to this, the configuration information by which the terminal uses the WLAN wireless resources may contain information indicating the WLAN access authentication. The WLAN cell configuration information may contain at least one piece of: WLAN cell identifier information; WLAN mobility set identifier information; band/frequency information; or WLAN identification information (BSSID/HESSID/SSIDs). The configuration information may contain information indicating the WLAN access authentication in the cell that requires the WLAN access authentication among the WLAN cells {or information indicating the cell (the WLAN primary cell) that is to perform the data transmission through the WLAN among the WLAN cells}.

When the information to indicate the WLAN access authentication cell or the information to indicate the cell that is to perform the WLAN data transmission is received, the terminal may perform the access authentication through the corresponding cell as shown in operation S460 and S462. In addition to this, the base station may transmit the MAC CE that allows the terminal to attempt the access authentication with respect to the WLAN access authentication cell, and the terminal may receive the MAC CE in order to thereby perform the access authentication with respect to the WLAN access authentication cell.

The base station may identify the success of the WLAN access authentication of the terminal in the access authentication operation S460 and S462. Alternatively, the base station may receive the WLAN access authentication success information from the terminal in order to thereby identify the success of the WLAN access authentication of the terminal.

After the base station identifies the success of the WLAN access authentication, the base station transmits, to the terminal, an RRCConnectionReconfiguration message that contains the tunnel bearer configuration. The terminal configures a tunnel bearer according to operation S470. The terminal configures the tunnel bearer according to operation S470, and then transmits a response of an RRCConnectionReconfigurationComplete message.

As another example, after the base station identifies the success of the WLAN access authentication, the base station transmits, to the terminal, an RRCConnectionReconfiguration message that contains the tunnel bearer configuration. The terminal applies the new configuration and transmits a response of an RRCConnectionReconfigurationComplete message. The terminal sets up a tunnel according to operation S470. If a problem occurs in the WLAN wireless link during the tunnel setup operation, the terminal may inform the base station of the same through an RRC message.

As another example in which the terminal 400 configures the wireless resource, the terminal 400 may include WLAN cell configuration information to use the WLAN carrier. The WLAN cell configuration information may contain at least one piece of: WLAN cell identifier information; WLAN mobility set identifier information; band/frequency information; and WLAN identification information (e.g., BSSID/HESSID/SSIDs). The cell configuration information may contain information to indicate the WLAN access authentication in the corresponding cell that requires the WLAN access authentication among the WLAN cells. Alternatively, the cell configuration information may contain information to indicate the cell (a WLAN primary cell) that is to perform the data transmission through the WLAN among the WLAN cells. Alternatively, the configuration information by which the terminal 400 uses the WLAN carrier may contain information to indicate the WLAN access authentication and configuration information to configure a tunnel (the IPsec tunnel) through the WLAN {e.g., a key value, security association/negotiation information, an encryption algorithm, or an authentication method (parameters for the IKE authentication procedure)}.

Upon the receipt of the information to indicate the WLAN access authentication cell or the information to indicate the cell that is to perform the WLAN data transmission, the terminal 400 may perform the access authentication through the corresponding cell as shown in operations S460 and S462. Alternatively, in addition to this, the base station 402 may transmit the MAC CE that allows the terminal 400 to attempt the access authentication with respect to the WLAN access authentication cell, and the terminal 400 may receive the MAC CE in order to perform the access authentication with respect to the WLAN access authentication cell.

The terminal 400 may set up the IPsec tunnel with the base station 402 through the WLAN carrier (S470). In the IPsec tunnel setup operation through the WLAN carrier, information on at least one of a key value, security association/negotiation information, an encryption algorithm, and an authentication method (parameters for the IKE authentication procedure) may be included in the RRC message to then be transmitted and received through a Uu interface between the terminal 400 and the base station 402. Alternatively, in the IPsec tunnel setup operation through the WLAN carrier, information on at least one of a key value, security association/negotiation information, an encryption algorithm, and an authentication method (parameters for the IKE authentication procedure) may be transmitted and received by using a path through the WLAN carrier.

If the IPsec tunnel setup is successful according to operations S460 and S462, the base station 402 may transmit, to the terminal 400, an RRCConnectionReconfiguration message including the tunnel bearer configuration information. The tunnel bearer configuration information may contain at least one piece of: eps bearer identification information (eps-bearerIdentity) for each tunnel bearer, IPSEC tunnel configuration information (e.g., an entity that performs at least one operation of IPsec header encapsulation/decapsulation, IPsec security association, or key exchange); security information; tunnel end point identification information of the base station (or DRB identification information); and tunnel end point identification information of the terminal. After configuring the tunnel bearer, the terminal 400 transmits the RRC connection reconfiguration completion message to the base station 402.

For example, the base station may transmit and receive data through the E-UTRAN bearer until the tunnel bearer is configured. Thereafter, the base station 402 may change the E-UTRAN bearer into the tunnel bearer through the RRCConnectionReconfiguration message, and may use the same.

As another example in which the terminal 400 configures the wireless resource, the terminal 400 configures configuration information to use the WLAN carrier in the terminal 400. The configuration information by which the terminal 400 uses the WLAN carrier may contain WLAN cells and configuration information of the WLAN tunnel bearer (hereinafter, referred to as a tunnel bearer for the convenience of description) that uses the IPsec tunnel through the WLAN cells. Alternatively, the configuration information may contain E-UTRAN bearer configuration information that is associated with the tunnel bearer. The WLAN has a small coverage and has difficulties to control wireless resources compared to the E-UTRAN. Therefore, in order for the terminal to quickly convert the bearer when the WLAN wireless link has a problem, the base station 402 may configure configuration information (DRB-ToAddMod) of an E-UTRAN bearer (fallback bearer), which uses the E-UTRAN cell in association with the tunnel bearer, in the terminal 400. The terminal 400 may identify that the corresponding wireless bearer is associated with the tunnel bearer by using one piece of: eps bearer identification information (eps-bearerIdentity); DRB identification information (drb-Identity); and information that indicates that the wireless bearer is associated with the tunnel bearer.

For example, the terminal 400 may transmit or receive data through the E-UTRAN bearer associated with the tunnel bearer until the data transmission is available through the WLAN carrier according to the WLAN access authentication (for example, until operation S460, S462, or S470, or until operation S460, S462, or S470 is completed before a specific timer expires after the timer was initiated). When the data transmission through the WLAN carrier becomes available after the WLAN authentication, the terminal 400 may disable the E-UTRAN bearer. When disabling the E-UTRAN bearer, the terminal may reconfigure the RLC entity and the PDCP entity.

As another example, the terminal 400 may disable the E-UTRAN bearer (or the bearer RLC/PDCP entity) associated with the tunnel bearer until a failure in the WLAN wireless link is detected and/or until the terminal releases the tunnel bearer. When the terminal 400 detects the failure in the WLAN wireless link, the terminal 400 may enable the E-UTRAN bearer associated with the tunnel bearer.

The failure in the WLAN wireless link described above may include at least one of the cases where: the WLAN wireless link quality (e.g., the beacon RSSI, the channel utilization, the backhaul rate, or the WLAN signal strength) of the terminal 400 is lower than a specific threshold value; the quality of the WLAN wireless link remains to be lower than a specific threshold value for a predetermined period of time; the feedback on the WLAN transmission is not received for a predetermined period of time; losses of more than a specific number are detected in the feedback on the WLAN transmission the WLAN access authentication has failed; and the WLAN access authentication is not successful for a predetermined period of time.

As described above, the terminal 400 may receive the configuration information from the base station in order to configure the IPsec tunnel and in order to set the data bearer. To this end, the terminal 400 may perform the WLAN access. For example, the terminal 400 performs the WLAN association. As another example, the terminal performs the WLAN access authentication with a WLAN node 401 (the WLAN AP/AC/Termination) (S460). The WLAN node 401 performs the authentication and authorization with an AAA/HSS 403 (S462).

Meanwhile, the IKE (Internet Key Exchange) tunnel establishment procedure may be initiated by the terminal 400. The IP address of the base station 402 that is required for the terminal 400 to establish the IPsec tunnel may be contained in the RRCConnectionReconfiguration message of operation S440 to then be provided.

For example, the IP address of the base station 402 may perform the resolution to use a DNS (domain name server). According to this, the IP address that allows only its own routing in the intranet may be allocated. The base station 402 may configure, in the terminal 400, the (DNS) server address to resolve the IP address of the base station 402 through the RRC message.

The terminal 400 and the base station 402 may set up the IPsec tunnel through the WLAN carrier according to the operation described above (S470).

Terminal IP Allocation and Change Procedure

Hereinafter, various embodiments for the WLAN access authentication process and the IP address allocation process for the establishment of the tunnel, which are performed in operations S460 and S462, will be described.

The terminal may perform the WLAN access authentication with a WLAN node (a WLAN AP/AC/Termination).

This may be performed through the access authentication procedure between a terminal defined in the 3GPP TS 33.402 and a 3GPP core network entity (AAA/HSS or 3GPP AAA proxy).

The AAA/HSS and/or the 3GPP AAA Proxy may execute the use of the IP address that is allocated by the WLAN node with respect to the successful authentication (or IPv6 Prefix) (hereinafter, it may be referred to as the IP address for the convenience of explanation, and in this case, it may include the IPv6 Prefix). After the authentication, the terminal is configured with the IP address allocated from the WLAN node. The IP address is used as a source address when sending a message for establishing the IPsec tunnel with the terminal, or the IP address is used as a source address on the outer header of the IPsec tunnel between the terminal and base station.

The base station should know the IP address of the terminal in order for the terminal and the base station to set up the IPsec tunnel through the WLAN.

As an example for this, when allocating/updating/releasing the IP address of the terminal, the AAA/HSS, the 3GPP AAA Proxy, the 3GPP core network entity (the MME or PGW), or the core network entity including a DHCP server function may make a control to transfer the IP address of the terminal, which is allocated/updated/released from the WLAN node, to the base station. For example, the IP address may be transferred through the S1 signaling by functions of the MME by using the core network control signaling. As another example, the IP address may be transferred by configuring the signaling between the AAA/HSS, the 3GPP AAA Proxy, the 3GPP core network entity (the MME or PGW), or the core network entity including a DHCP server function and the base station.

As another example, when the terminal is allocated with the IP address from the WLAN node according to the wireless resource configuration information of the base station as in operation S440, the terminal may include the IP address of the terminal, which is allocated from the WLAN node, in the RRC message (e.g., a WLAN status/information message) to then be transferred to the base station through the interface (Uu) between the terminal and the base station. In addition to this, if the association of the terminal is released from the WLAN node so that the IP address is released, the base station may be informed of the same. For example, when the existing access authentication/WLAN association/tunnel establishment is released/modified/changed according to at least one of: the release of the WLAN cell of the base station; the release of the tunnel bearer associated with the WLAN cell; the release of the WLAN mobility set a change of the WLAN mobility set; a change of the base station; or the modification of the tunnel bearer associated with the WLAN cell, the base station may be informed of the IP address release/modification/change. As another method, the terminal may include the IP address of the terminal, which is allocated from the WLAN node, in the MAC CE to then be transferred to the base station through the interface (Uu) between the terminal and the base station.

Processing Method when Base Station Allocates IP Address

As another example, a WLAN access authentication procedure between the terminal and the base station may be performed. The base station may execute the use of the IP address (or the IPv6 Prefix) that is allocated in the WLAN node with respect to the successful authentication. For example, if the terminal requests the IP address (or the IPv6 Prefix) through a DHCP protocol, the WAN node makes a request to the base station for the IP address (or the IPv6 Prefix) by an authentication and authorization message together. In order for the WLAN node to perform the IP address allocation through the base station of the terminal, the terminal may transfer information (e.g., DHCP option information, option 82, or added fields) to indicate the same to the WLAN node. For example, the information to indicate the WLAN node to perform the IP address allocation of the terminal through the base station may be contained in the RRCConnectionReconfiguration message of operation S440 to then be provided to the terminal.

According to the information {e.g., at least one piece of WLAN node identification information, the candidate IP address (or the IPv6 Prefix), or version information} in the authentication and authorization message for which the WLAN node has made a request to the base station, the base station may designate the IP address (or the IPv6 Prefix) to be allocated through the corresponding WLAN node, and may provide the same to the WLAN node. In addition, the WLAN node may provide the corresponding IP address (or IPv6 Prefix) to the terminal to configure the same. After the authentication, the terminal is configured with the IP address that is allocated from the WLAN node. The IP address is used as a source address when sending a message for establishing the IPsec tunnel with the terminal, or the IP address is used as a source address on the outer header of the IPsec tunnel between the terminal and base station. According to this, the base station may identify the corresponding terminal.

Data Identification According to IPsec Tunnel Usage

With regard to the RRC connection terminal without the update of the existing WLAN AP, a tunnel (e.g., the IPsec tunnel) is created in the terminal and the base station in order to transmit data through the WLAN between the terminal and the base station. For example, the IPsec tunnel may be configured between the terminal and the base station, and the IPsec tunnel may be configured through the WLAN carrier. As another example, the IPsec tunnel may be configured between the terminal and a gateway that is connected to the base station, and the IPsec tunnel may be configured through the WLAN carrier.

Since the IP packet of the IPsec tunnel is encapsulated and is transmitted/received between two nodes that constitute the tunnel, it is not easy to identify bearers provided from the E-UTRAN and to process the QoS according to the same. In order to solve the problem, the following embodiments may be used.

First Embodiment: Configuring Tunnel Entity for Each Wireless Bearer

The tunnel entity may be configured for each bearer in the terminal and the base station. That is, the base station may allow the entity for each bearer to be configured in the terminal.

For example, the tunnel entity configured for each bearer may add data bearer identification information to the IP packet, which is separated for each core network interface bearer (the eps bearer) to be received, in order to submit the same to the IPsec layer. The tunnel entity may remove the data bearer identification information from the data received from the IPsec layer in order to thereby transfer the same to the upper layer (e.g., the NAS or the eps bearer). As another example, the tunnel entity configured for each bearer may perform at least one of the operations of transferring the data received through the IPsec header encapsulation/decapsulation and the WLAN carrier to the upper layer (e.g., the NAS or eps bearer); and submitting the data received from the upper layer to the lower layer (the WLAN MAC) in order to transmit the data through the WLAN carrier.

More specifically, the tunnel entity may add information for identifying the bearers to the field of the IPsec header. For example, the tunnel entity may allow the information for identifying the bearers to be contained in the additional header or in the existing IPsec header.

Alternatively, the tunnel entity may allow the information for identifying the bearers to be contained in the inner field of the IPsec header. For example, the tunnel entity may add a new field to the innermost part of the IPsec payload and may allow the same to contain the information for identifying the bearers. As another example, the tunnel entity may add the information for identifying the bearers to the IP packet to then be transmitted through the IPsec tunnel. Alternatively, the tunnel entity submits the same to the WLAN MAC through the lower layer (the IPsec instance or IPsec).

Alternatively, the tunnel entity may allow the information for identifying the bearers to be contained in the outer field of the IPsec header.

The aforementioned information for identifying the bearers may be one of eps bearer identification information (eps-bearerIdentity); DRB identification information (DRB-identity); and logical channel identification information.

The terminal may submit, to the corresponding tunnel entity, the data for each bearer of the upper layer (e.g., the NAS) through the eps bearer identification information (eps-bearerIdentity) for each tunnel bearer, the DRB identification information (DRB-identity), or the logical channel identification information, which is contained in the configuration information for each tunnel bearer included in the RRC message that is received from the base station. Alternatively, the terminal may transfer, to the upper layer bearer, the data that is received through the WLAN carrier and is transferred to the corresponding tunnel entity. The configuration information for each tunnel bearer, which is contained in the RRC message, may contain at least one piece of eps bearer identification information (eps-bearerIdentity); DRB identification information (drb-Identity); logical channel identification information; tunnel entity configuration information; security information; tunnel end point identification information of the base station; and tunnel end point identification information of the terminal.

Second Embodiment: Configured to Identify Wireless Bearers in IPsec Tunnel Instance The IPsec tunnel (or an IPsec tunnel instance for the same, and hereinafter, referred to as an IPsec tunnel instance) that is terminal-specifically configured in the terminal and the base station may perform at least one of the operations of: transferring the data received through the IPsec header encapsulation/decapsulation and the WLAN carrier to the upper layer (e.g., the NAS or eps bearer); and submitting the data received from the upper layer to the lower layer (the WLAN MAC) in order to transmit the data through the WLAN carrier.

For example, the IPsec tunnel instance may add the bearer identification information to the IP packet, which is separated for each core network interface bearer (the eps bearer) to be received, in order to submit the same to the lower layer (the WLAN MAC). The IPsec tunnel instance may remove the bearer identification information from the data received from the lower layer (the WLAN MAC) in order to transfer the same to the upper layer (e.g., the NAS or the eps bearer). The IPsec tunnel instance multiplexes the data (IP packets) for each core network interface bearer, which is received from the upper layer, and submits the same to the lower layer (WLAN MAC). The IPsec tunnel instance may add the bearer identification information to the data (IP packets) for each core network interface bearer, which is received from the upper layer. The IPsec tunnel instance may demultiplex the data that is transferred from the lower layer (WLAN MAC). The IPsec tunnel instance may transfer the same to the upper layer. The IPsec tunnel instance may transfer the data (the IP packet to which the identification information for each bearer is added) that is transferred from the lower layer to the associated upper layer bearer based on the identification information for each bearer.

Third Embodiment: Configuring Entity for Each Wireless Bearer in Upper Layer of IPsec Tunnel Instance or Configuring Terminal-Specified Tunnel Entity in Upper Layer of IPsec Tunnel Instance The IPsec tunnel is terminal-specifically configured in the terminal and the base station. Such an IPsec tunnel may perform at least one of operations of: transferring the data that is received through the IPsec header encapsulation/decapsulation and the WLAN carrier to the upper layer (e.g., the upper tunnel entity); and submitting the data that is received from the upper layer (e.g., the upper tunnel entity) to the lower layer (the WLAN MAC) in order to transmit the data through the WLAN carrier.

For example, the upper tunnel entity may be configured for each wireless bearer. The upper tunnel entity may add the DRB identification information (DRB-identity).

As another example, the upper tunnel entity may be terminal-specifically configured. The upper tunnel entity may add the DRB identification information (DRB-identity). The upper tunnel entity may perform the multiplexing or demultiplexing for each wireless bearer. That is, the upper tunnel entity may add the DRB identification information (DRB-identity), the eps identification information (eps-bearerIdentity), or the logical channel identifier with respect to the user data for each upper layer (the NAS or eps bearer) eps bearer. The upper tunnel entity may transfer the data through the IPsec tunnel by using the WLAN wireless resource. In addition, the upper tunnel entity may remove the DRB identification information (DRB-identity), the eps identification information (eps-bearerIdentity), or the logical channel identifier from the data that is received by using the WLAN wireless resource to then be transferred by the IPsec tunnel. The upper tunnel entity may transfer the same to the corresponding upper eps bearer.

Meanwhile, a change between the WLAN mobility sets or the release of the WLAN cell may occur according to the movement of the terminal. At this time, in order to prevent discontinuation of the data transmission of the tunnel bearer for transmitting and receiving data through the IPsec tunnel using the WLAN carrier or in order to reduce losses thereof the tunnel entity may be configured in the upper layer of the IPsec tunnel instance. For example, the data that has been successfully transferred through the tunnel entity in the upper layer of the IPsec tunnel or the lost data information can be identified.

As described above, the present embodiment may provide the LTE WLAN aggregation/integration based on the tunnel in which the existing WLAN AP can be reused. In addition, the present embodiment may provide the data identification process for each wireless bearer by providing a terminal IP allocating and changing process associated with the WLAN tunnel establishment and by providing a method for identifying and controlling the data on the tunnel.

The configurations of the terminal and the base station for performing all of the operations of the present embodiments described with reference to FIGS. 1 to 4 will be described.

Figure 5:
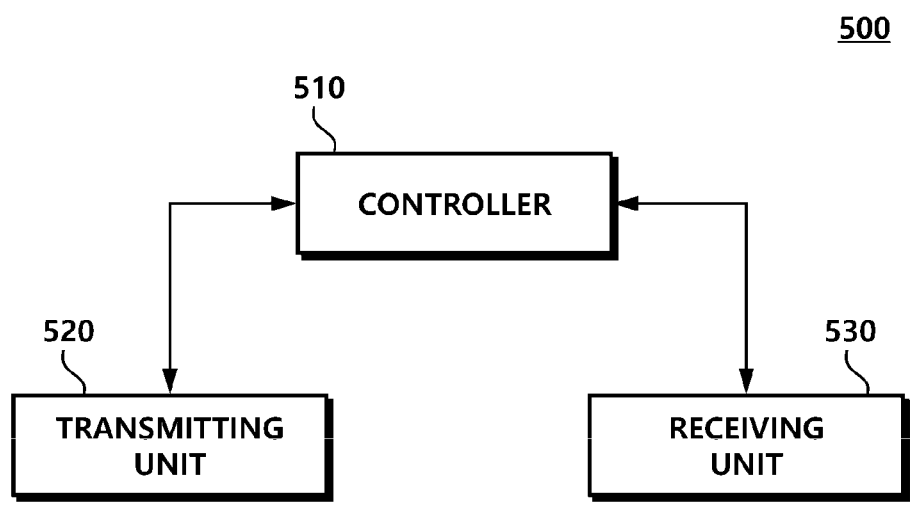
FIG. 5 is a view for explaining the configuration of a terminal according to an embodiment.

FIG. 5 is a view for explaining configuration of a terminal according to an embodiment.

Referring to FIG. 5, a terminal 500 may include: a receiving unit 530 configured to receive configuration information for transmitting and receiving data to and from the base station by using an IPsec (Internet Protocol Security) tunnel through a WLAN (wireless local area network) carrier, a controller 510 configured to configure the IPsec tunnel based on the configuration information and set a data bearer by using the IPsec tunnel; and a transmitting unit 520 configured to transmit, to the base station, data that is received from the upper layer in the tunnel entity of the terminal by using the IPsec tunnel.

The controller 510 may add the WLAN carrier without a change of the existing WLAN node in order to configure the IPsec tunnel for the data transmission and reception between the terminal and the base station. The IPsec tunnel may be configured between the terminal and the base station and may be configured through the WLAN carrier.

In addition, the controller 510 may set the data bearer for transmitting and receiving data to and from the base station through the configured IPsec tunnel. The controller 510 may configure a tunnel entity for identifying the wireless bearers with respect to the data transmitted and received through the IPsec tunnel. The tunnel entity may add the bearer identification information to the data that is received from the upper layer in order to thereby transfer the same to the lower layer. The tunnel entity may remove the bearer identification information from the data that is received from the lower layer in order to thereby transfer the same to the upper layer.

The receiving unit 530 may receive the configuration information from the base station in order to configure the IPsec tunnel. For example, the configuration information may contain at least one piece of: WLAN identification information; IP (Internet Protocol) address information for the IPsec tunnel; IKE (Internet Key Exchange) configuration information; and data bearer identification information. As another example, the configuration information may contain WLAN cell configuration information. The WLAN cell configuration information may contain at least one piece of: WLAN cell identifier information; WLAN mobility set identifier information; band/frequency information; or WLAN identification information (e.g., BSSID/HESSID/SSIDs). The configuration information may contain information for instructing the WLAN access authentication with respect to the cell that requires the WLAN access authentication among the WLAN cells. As another example, the configuration information may contain information indicating the WLAN access authentication in order for the terminal to use the WLAN carrier. Furthermore, the configuration information may contain information necessary for the terminal and the base station to configure the IPsec tunnel through the WLAN carrier. The receiving unit 530 may receive the reconfiguration information through the RRC connection reconfiguration message.

Furthermore, the receiving unit 530 receives downlink control information, data, and messages from the base station through the corresponding channel.

In addition, the controller 510 controls the overall operations of the terminal 500 according to the providing of a terminal IP allocating and changing process, which is associated with the IPsec tunnel establishment necessary for executing the present embodiments described above, and a method for identifying and controlling the data on the tunnel.

The transmitting unit 520 may transmit, to the base station, uplink control information, data, or messages through the corresponding channel. In addition, the data may be transmitted through the IPsec tunnel.

Figure 6:
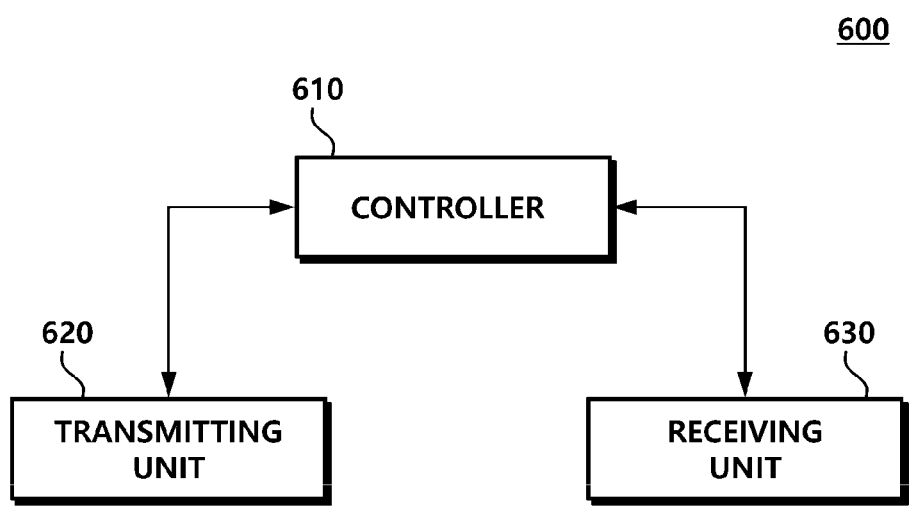
FIG. 6 is a view for explaining the configuration of a base station according to an embodiment.

FIG. 6 is a view for explaining configuration of a base station according to an embodiment.

Referring to FIG. 6, a base station 600 may include: a transmitting unit 620 configured to transmit configuration information for transmitting and receiving data to and from the terminal by using an IPsec (Internet Protocol Security) tunnel through a WLAN (wireless local area network) carrier, a receiving unit 630 configured to receive data by using the IPsec tunnel; and a controller 610 configured to transfer the data that is received by using the IPsec tunnel to the upper layer in the tunnel entity of the base station.

The transmitting unit 620 may transmit the configuration information to the terminal through the upper layer signaling (e.g., the RRC connection reconfiguration message). For example, the configuration information may contain at least one piece of: WLAN identification information; IP (Internet Protocol) address information for the IPsec tunnel; IKE (Internet Key Exchange) configuration information; and data bearer identification information. As another example, the configuration information may contain WLAN cell configuration information. The WLAN cell configuration information may contain at least one piece of: WLAN cell identifier information; WLAN mobility set identifier information; band/frequency information, and WLAN identification information (e.g., BSSID/HESSID/SSIDs). The configuration information may contain information for instructing the WLAN access authentication with respect to the cell that requires the WLAN access authentication among the WLAN cells. As another example, the configuration information may contain information indicating the WLAN access authentication in order for the terminal to use the WLAN carrier. Furthermore, the configuration information may contain information necessary for the terminal and the base station to configure the IPsec tunnel through the WLAN carrier.

The receiving unit 630 may receive data that is received through the IPsec tunnel.

The controller 610 may configure the IPsec tunnel, and the controller 610 may set the data bearer using the IPsec tunnel. In addition, the controller 610 may control the tunnel entity to add the bearer identification information to the data that is received from the upper layer and to transfer the same to the lower layer. Alternatively, the controller 610 may control the tunnel entity to remove the bearer identification information from the data received from the lower layer and to transfer the same to the upper layer. Furthermore, the controller 610 controls the overall operations of the base station according to the providing of a terminal IP allocating and changing process, which is associated with the WLAN tunnel establishment necessary for executing the present embodiments described above, and according to a method for identifying and controlling the data on the tunnel.

The transmitting unit 620 and the receiving unit 630 are used to transmit and receive signals, messages, or data necessary for executing the present invention described above to and from the terminal.

The standard content or standard documents described in the foregoing embodiments, which have been omitted for the simplicity of the specification, are incorporated into the present specification. Therefore, the addition of some of the standard content or standard documents to the present specification, or the description thereof in the claims, should be construed to fall within the scope of the invention.

Although embodiments of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method for transmitting and receiving data by a terminal, the method comprising:
  receiving configuration information for transmitting data to and receiving data from the base station by using an IPsec (Internet Protocol Security) tunnel through a WLAN (wireless local area network) carrier;
  configuring the IPsec tunnel based on the configuration information and setting a data bearer by using the IPsec tunnel; and
  transmitting data to the base station using the IPsec tunnel formed by a controller of the terminal,
  wherein the configuration information includes IP address information for the IPsec tunnel and IKE (Internet Key Exchange) configuration information,
  wherein the controller of the terminal is configured to perform encapsulation and decapsulation operations of the data that is transmitted and received through the IPsec tunnel between the terminal and the base station, where the performing of the encapsulation and decapsulation operations includes adding or removing bearer identification information to or from the data transmitted or received through the IPsec tunnel,
  wherein the controller of the terminal is configured to:
  receive a service data unit (SDU) from an IP layer;
  identify a core network interface bearer associated with the received SDU;
  add a tunnel header including the bearer identification information based on the identification result to the SDU; and
  transfer the SDU having the tunnel header to a lower layer,
  wherein the core network interface bearer associated with the received SDU and the bearer identification information included in the tunnel header are separated from each other,
  wherein the core network interface bearer is EPS (Evolved Packet switched System) bearer,
  wherein the bearer identification information is data wireless bearer identification information (DRB-Identity),
  wherein the method comprises:
  performing a mobility operation between WLAN Aps (WLAN Access Points) based on a WLAN mobility set information including identification information about one or more WLAN Aps received from the base station without informing the base station, and
  wherein the controller of the terminal is configured to:
  receive a protocol data unit (PDU) from the base station through the IPsec tunnel;
  remove a tunnel header including bearer identification information from the PDU; and
  transfer the removed bearer identification information PDU to the IP layer in the terminal.

2. The method according to claim 1, wherein the configuration information further contains at least one piece of: WLAN identification information and data bearer identification information.

3. The method according to claim 1, wherein the controller is terminal-specifically configured.

4. A terminal for transmitting and receiving data, the terminal comprising:
  a receiver configured to receive configuration information for transmitting and receiving data to and from a base station by using an IPsec (Internet Protocol Security) tunnel through a WLAN (wireless local area network) carrier;
  a controller configured to configure the IPsec tunnel based on the configuration information and configured to set a data bearer by using the IPsec tunnel; and
  a transmitter configured to transmit data to the base station using the IPsec tunnel formed by a controller of the terminal,
  wherein the configuration information includes IP address information for the IPsec tunnel and IKE (Internet Key Exchange) configuration information; and
  wherein the controller is configured to perform encapsulation and decapsulation operations of the data that is transmitted and received through the IPsec tunnel between the terminal and the base station, where the performing of the encapsulation and decapsulation operations includes adding or removing bearer identification information to or from the data transmitted or received through the IPsec tunnel,
  wherein the controller of the terminal is configured to:
  receive a service data unit (SDU) from an IP layer;
  identify a core network interface bearer associated with the received SDU;
  add a tunnel header including the bearer identification information based on the identification result; and
  transfer the SDU having the tunnel header to a lower layer,
  wherein the core network interface bearer associated with the received SDU and the bearer identification information included in the tunnel header are separated from each other,
  wherein the core network interface bearer is EPS (Evolved Packet switched System) bearer,
  wherein the bearer identification information is data wireless bearer identification information (DRB-Identity),
  wherein the terminal is configured to:
  perform a mobility operation between WLAN Aps (WLAN Access Points) based on a WLAN mobility set information including identification information about one or more WLAN Aps received from the base station without informing the base station, and
  wherein the controller is configured to:
  receive a protocol data unit (PDU) from the base station through the IPsec tunnel;

remove a tunnel header including bearer identification information from the PDU; and transfer removed bearer identification information PDU to the IP layer in the terminal.

5. The terminal according to claim 4, wherein the configuration information further contains at least one piece of: WLAN identification information and data bearer identification information.

6. The terminal according to claim 4, wherein the controller is terminal-specifically configured.

* * * * *